Patented Dec. 14, 1926.

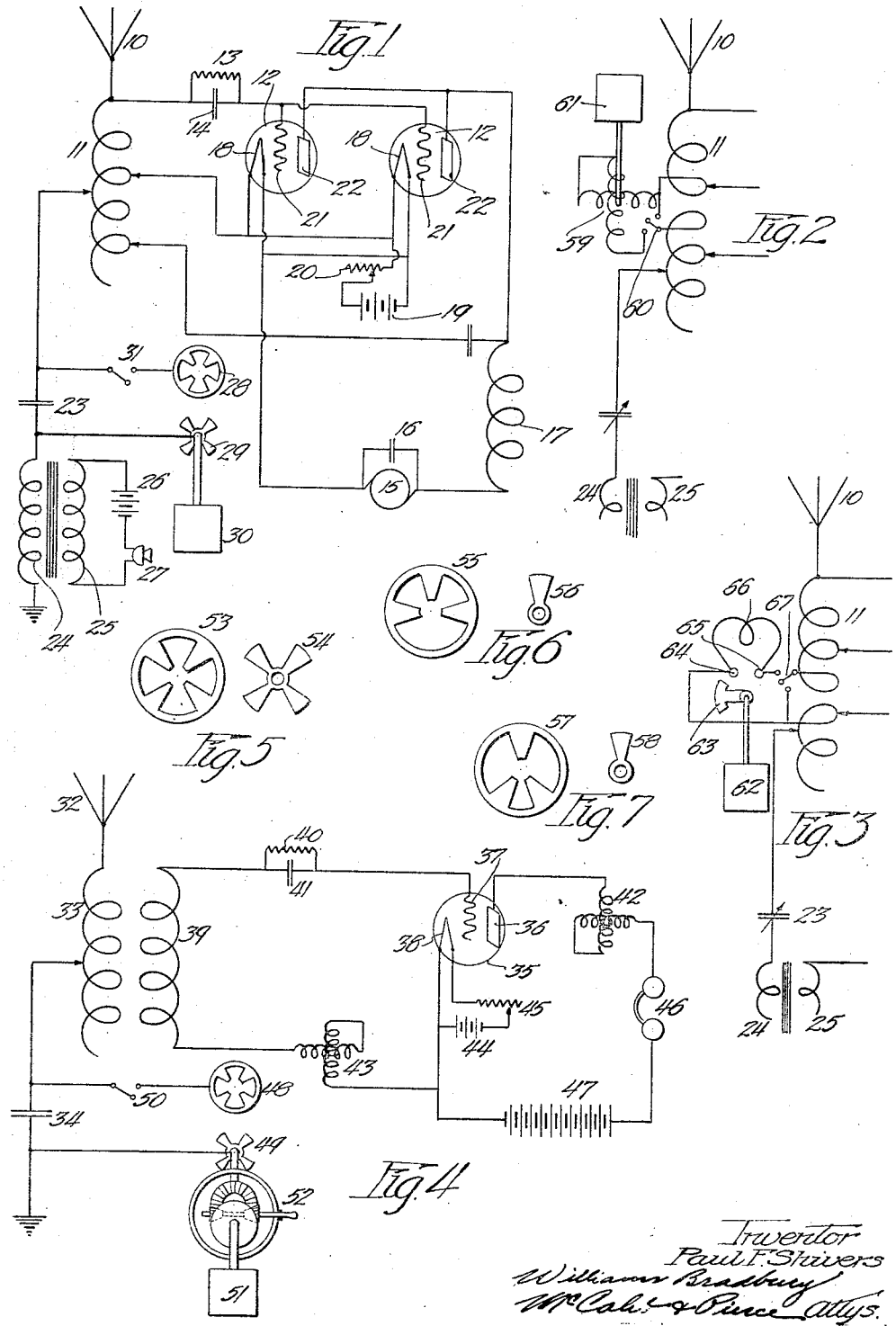

1,610,329

UNITED STATES PATENT OFFICE.

PAUL F. SHIVERS, OF RACINE, WISCONSIN, ASSIGNOR TO WEBSTER ELECTRIC COMPANY, OF RACINE, WISCONSIN, A CORPORATION OF WISCONSIN.

WIRELESS APPARATUS.

Application filed October 19, 1922. Serial No. 595,516.

This invention relates to wireless telephone or telegraph circuits, and particularly to means associated with such circuits by means of which the messages transmitted may not be intelligently received except at a receiving station provided with equipment similar to that herein disclosed.

The principal feature of the invention is the provision of means associated with the sending or transmitting circuit whereby the wave length of the oscillations is varied during the sending operation, and similar means associated with the receiving circuit such that the characteristics of the receiving circuit will be varied uniformly and synchronously with those of the sending or transmitting circuit.

Referring to the drawings,

Figure 1 is a diagrammatic illustration of a transmitting circuit of well known character, with the present invention applied thereto;

Figure 2 shows a portion of a transmitting circuit with a modified arrangement of the invention associated therewith;

Figure 3 is similar to Figure 2, but shows a further modification of the means for varying the wave length of the transmitting circuit;

Figure 4 shows a receiving circuit of well known character with applicant's invention applied thereto;

Figures 5, 6 and 7 show modified forms of the rotary condenser plates which may be employed in carrying out the invention.

Generally stated, one form of the invention consists of a variable condenser in the transmitting circuit, and means for constantly or intermittently operating it so as to vary the wave length during the sending operation, and like means in the receiving circuit similarly operated so that the receiving circuit will be maintained in step with the sending circuit. If desired, variable impedances, preferably of the variometer type, may be used instead of the variable condensers.

In the drawings, Figure 1 indicates a transmitting circuit of a well known type. The antenna is indicated at 10, the oscillation transformer at 11, and the vacuum tubes at 12 and 12'. At 13 is indicated the grid leak which is in parallel with the grid condenser 14. A generator or other source of current is indicated at 15. In parallel with the generator 15 is a condenser 16, and in series with the generator 15 is an impedance coil 17, the condenser 16 and coil 17 acting to smooth out the pulsations from the generator 15. In series with the filaments 18 is a local battery 19 and the adjustable resistance 20. At 21 is indicated the grids of the vacuum tubes, and at 22 the plates. The transformer 11 is connected to ground through the tuning condenser 23, and the secondary 24 of the modulation transformer. Associated with the coil 24 is the primary coil 25 which is in series with the local battery 26 and the transmitter 27.

In parallel with the tuning condenser 23 is a variable condenser, preferably of the rotary type, a stationary plate being indicated at 28 and a rotary plate at 29. A motor, by means of which the rotary plate may be driven, is indicated at 30. 31 represents a switch by means of which the variable condenser may be isolated from the sending circuit. It is readily understood that with the switch 31 closed, if the condenser plates 29 are rotated, the wave length of the transmitting circuit will be constantly changed.

In operation, the variable condenser, consisting of plates 28 and 29, will be placed in its minimum position, and the circuit will then be adjusted to its proper or desired value. Then upon starting the motor 30, the characteristics of the circuit will be constantly varied, as above explained. A receiving set which has been tuned to respond to the normal characteristics of the sending circuit will not respond to the oscillations sent out when the characteristics have been changed by the operation of the variable condenser.

In practice, a difference of at least ten per cent between the maximum and minimum wave length should be provided. It is, of course, understood that the motor which drives the rotary plate 12 should be provided with governing means so that it will rotate at a uniform speed.

Referring to Figure 4, 32 represents the antenna which is connected to the primary 33 of the transformer, which in turn is connected to ground through the tuning condenser 34. This receiving circuit may be of any desired or preferred character. At 35 is indicated a vacuum tube having the plate 36, grid 37 and filament 38. The grid 37 is connected to the secondary 39 of the transformer through the grid leak 40 and condenser 41. At 42 and 43 are indicated variable impedances, preferably of the variometer type. The filament 38 is in series with a local battery 44 and adjustable resistance 45. At 46 is shown the receiving device, and at 47 is indicated the high voltage battery used in the receiving set.

In parallel with the tuning condenser 34 is a variable condenser which, in the present case, consists of stationary plates such as 48, and movable or rotary plates such as 49. A switch by means of which the variable condenser may be isolated from the antenna circuit is indicated at 50. At 51 is indicated a motor which is joined to the shaft carrying the rotary plates 49 of the condenser through a differential gearing, schematically indicated at 52. The motor 51 will be provided with means for adjusting the speed through a considerable range, but when once adjusted, the speed will be maintained at a substantially constant value.

In Figure 5, 53 indicates a stationary condenser plate, and 54 a corresponding rotary condenser plate. In Figure 6, 55 indicates a stationary condenser plate, and 56 a rotary condenser plate for use therewith. In Figure 7, 57 indicates a stationary condenser plate, and 58 a rotary condenser plate. Different types of condenser plates may be employed to obtain different changes in wave length.

In practice, the transmitting station will call the desired receiving station by sending oscillations of the required frequency or wave length, the rotary condensers of both the sending and receiving stations being cut off at this time. The transmitting station will then advise the receiving station by some code, for instance, as by A—1—A, that the message will be transmitted in a certain manner, for instance, the first "A" may indicate a change of 100 meters in wave length, the "1" may indicate that the speed of the motor driven variable condenser will be 1000 R. P. M., and the second "A" may indicate the form of condenser plates, such, for instance, as those shown in Figure 6, are to be used. The apparatus at the sending and receiving stations will then be adjusted correspondingly.

Although the motors of the sending and receiving stations may be operating at the same speed, still the condensers may not be in step. By the operation of the differential 52, the condenser of the receiving set may be adjusted so as to be in step with the corresponding condenser of the transmitting station, after which the oscillations sent out by the transmitting station will be received perfectly by the receiving set, notwithstanding the constantly varying wave length of the oscillations.

In practice, because of the change in tuning of the antenna circuit by the rotary condenser, it will be found desirable to provide other suitable rotary condensers in the plate and grid circuits to vary uniformly and synchronously the wave lengths of the internal circuits. This may be accomplished by placing on the motor shafts the various rotary plates of the different condensers.

Referring now to Figure 2, 59 indicates a variable impedance, preferably of the variometer type, which is bridged across a break in the oscillation transformer of the transmitting circuit. At 60 is indicated a switch by means of which the variometer 59 may be included or excluded from circuit with the antenna. At 61 is indicated a motor for driving the movable coil of the variometer. The circuit of Figure 2 may be in all respects similar to that shown in Figure 1, except for the use of the variometer in the place of the rotary condenser, including the plates 28 and 29 and, therefore, need not be further described.

In Figure 3, 62 indicates a motor for driving the movable contact or brush 63. Brush 63 is adapted to wipe over the contacts 64 and 65 and thus intermittently short circuit the impedance 66. 67 indicates a switch by means of which the impedance 66 may be included or excluded from circuit with the antenna. If desired, the rotary switch 63 may be arranged to short circuit all or any part of the impedance 66 or to short circuit different parts of the impedance at different rotary positions.

It is, of course, to be understood that when the transmitting station is provided with the variometer, such as shown in Figure 2, or the short circuiting switch, such as shown in Figure 3, the receiving station will be provided with like means for similarly varying the characteristics of the receiving circuit. When the switch shown in Figure 3 is employed, the changes in wave length will be abrupt and not gradual as with the other devices, and it will, therefore, be necessary that the receiving station be provided with similar means, and that this means is in exact step with the switch of the sending circuit in order that portions of the message transmitted may not be lost.

As above stated, the principal idea of the invention resides in providing a transmitting station with means for periodically lengthening and shortening the wave length of the oscillations sent out, and a receiving station also provided with similar means for adjusting the wave length of the receiving apparatus in synchronism with the changes in wave length of the waves being received.

While in the accompanying drawings and in the above description, certain definite forms of devices for varying the wave length are disclosed, it is to be understood that other modifications are contemplated, and the invention, therefore, is to be limited merely by the scope of the appended claims.

Having now described my invention, what I claim as new and desire to secure by Letters Patent of the United States is:

1. In wireless apparatus, an antenna circuit, an oscillation circuit comprising a vacuum tube for producing oscillations in said circuit, said oscillation-producing circuit being coupled to said antenna circuit, a modulation circuit for impressing voice modulations on said antenna circuit, a voice transmitter in said modulation circuit, a rotary variable condenser adapted to produce wave length variations in said antenna circuit, said variable condenser having segmental plates proportioned to produce a wave length variation of at least 10%, an electric motor for driving said variable condenser, and switch mechanism for placing said variable condenser in coupled connection with said antenna circuit at a point between said oscillation-producing circuit and said modulation circuit.

2. In a wireless circuit, an antenna circuit, a rotary condenser associated therewith, a motor for driving the movable plates of said condenser, and manually operable means positioned between said motor and said movable plates for adjusting the relation of said plates to said motor during the operation of said motor.

3. In wireless apparatus, the combination of an antenna circuit, a rotary condenser associated therewith, said rotary condenser comprising a stationary plate and a rotatable plate, an electric motor for driving said rotatable plate, and transmission mechanism comprising a driving gear connected to said motor, a driven gear connected to said rotatable plate, and an intermediate gear connecting said first two gears, and means for adjusting said intermediate gear in synchronizing said condenser to the wave broadcasted.

4. In a wireless circuit, an antenna circuit, a rotary condenser having coupled connection to said antenna circuit, said rotary condenser comprising a stationary plate of segmental form and a rotatable plate of segmental form, a shaft extending from said rotatable plate, an electric motor for driving said rotatable plate, a driving bevel gear connected to said electric motor, a driven bevel gear connected to the shaft extending from said rotatable plate, a pair of bevel pinions, and an adjustable yoke pivotally mounting said pinions in mesh with both of said bevel gears, adjustment of said yoke being operative to vary the synchronous relation between said rotatable plate and said electric motor.

In witness whereof, I hereunto subscribe my name this 25th day of September, 1922.

PAUL F. SHIVERS.